(12) United States Patent
McGraw

(10) Patent No.: US 6,358,330 B1
(45) Date of Patent: Mar. 19, 2002

(54) TRUCK TIRE WASHING APPARATUS AND METHOD

(76) Inventor: John P. McGraw, 15432 Statesville Rd., Huntersville, NC (US) 28078

(*) Notice: Subject to any disclaimer, the term of this patent is extended or adjusted under 35 U.S.C. 154(b) by 0 days.

(21) Appl. No.: 09/520,115

(22) Filed: Mar. 7, 2000

(51) Int. Cl.[7] .................................................. B60S 3/04
(52) U.S. Cl. ........................ 134/34; 134/104.4; 134/123
(58) Field of Search .......................... 134/34, 45, 104.4, 134/123; 15/53.4

(56) References Cited

U.S. PATENT DOCUMENTS

| | | | | |
|---|---|---|---|---|
| 3,321,793 A | * | 5/1967 | Braunger | 134/45 X |
| 3,903,559 A | * | 9/1975 | Kuster et al. | 134/45 X |
| 4,979,536 A | * | 12/1990 | Midkiff | 134/123 |
| 5,261,433 A | * | 11/1993 | Smith | 134/123 |

FOREIGN PATENT DOCUMENTS

| | | | | |
|---|---|---|---|---|
| DE | 2117147 | * | 10/1972 | 134/123 |
| EP | 0041087 | * | 12/1981 | 134/123 |
| GB | 2242407 | * | 10/1991 | 134/45 |

* cited by examiner

Primary Examiner—Philip Coe
(74) Attorney, Agent, or Firm—Christopher C. Dremann

(57) ABSTRACT

An apparatus for washing mud, dirt and silt from the tires of a truck leaving a construction site includes a water supply line, a collection basin and a grate positioned over the collection basin. The apparatus further includes an optional side rail attached to the collection basin above the grate and an optional drainage system comprising a plurality of drain ports formed in the collection basin. Preferably, water from an external water source flows through the water supply line to a selector valve in fluid communication with the grate and the side rail. The grate comprises a plurality of spray tubes having a plurality of spray ports formed therein and the side rail comprises at least one side rail spray tube having a plurality of side rail spray ports formed therein. The selector valve may be positioned to permit water to flow only to the grate, to the grate and the side rail, or only to the side rail. The truck is driven over the grate and the water delivered to the spray ports is directed onto the tires of the truck. The mud, dirt and silt and the run-off water collects in the collection basin. Once the level of the run-off water reaches the level of the drain ports of the drainage system, the run-off water is drained from the collection basin to a recycling tank or a storm drain. Once the mud, dirt and silt reach a predetermined amount, it is removed from the collection basin.

18 Claims, 6 Drawing Sheets

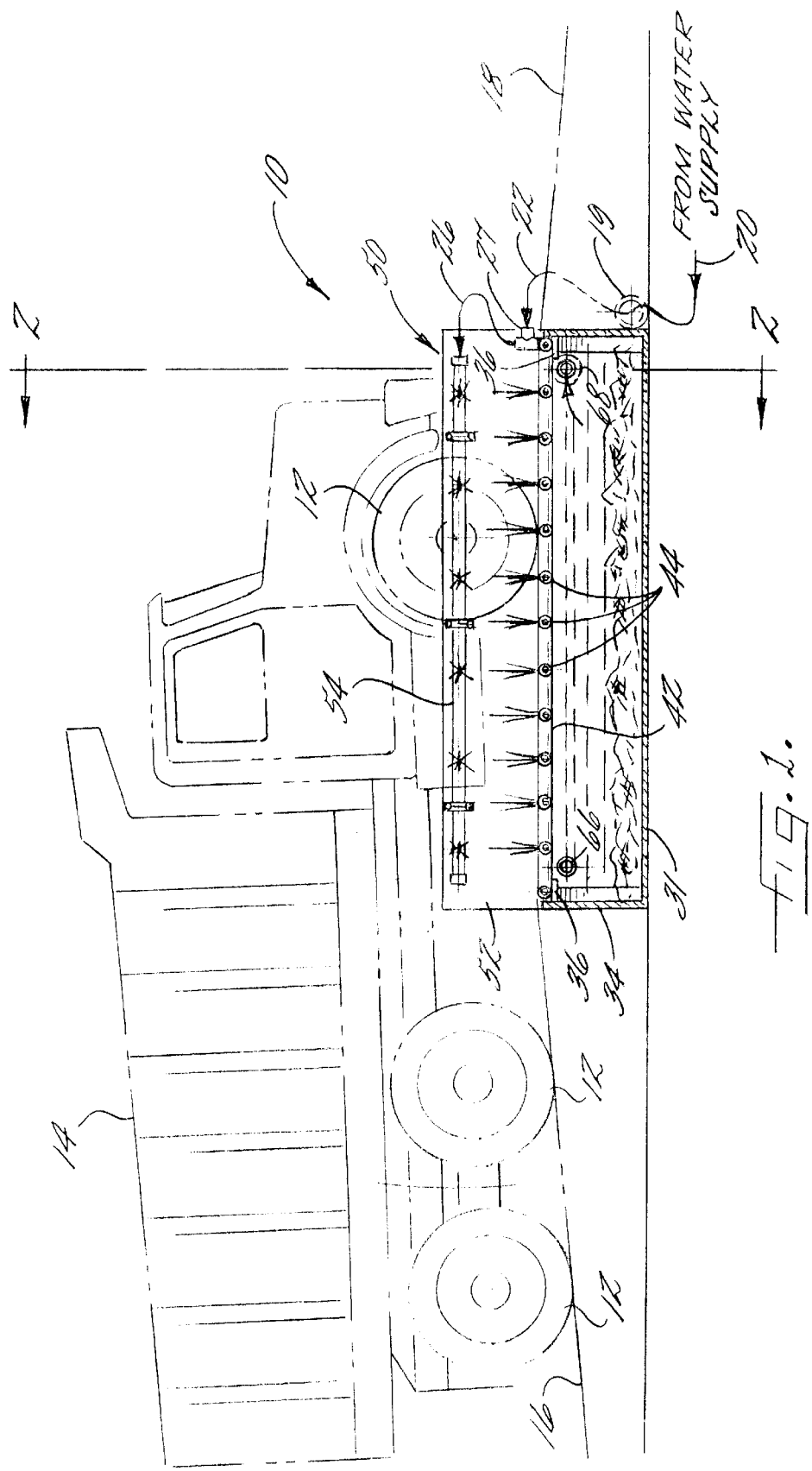

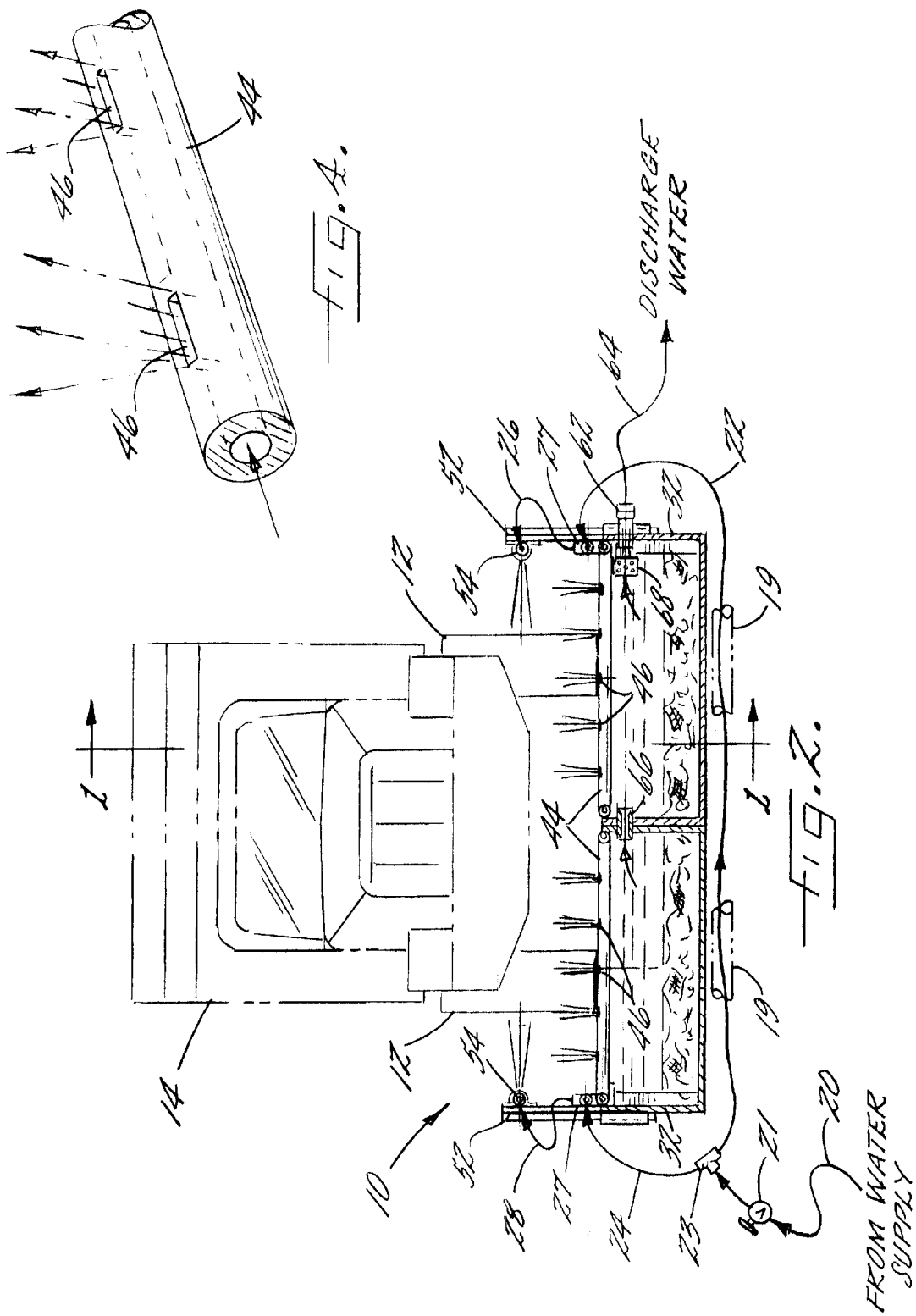

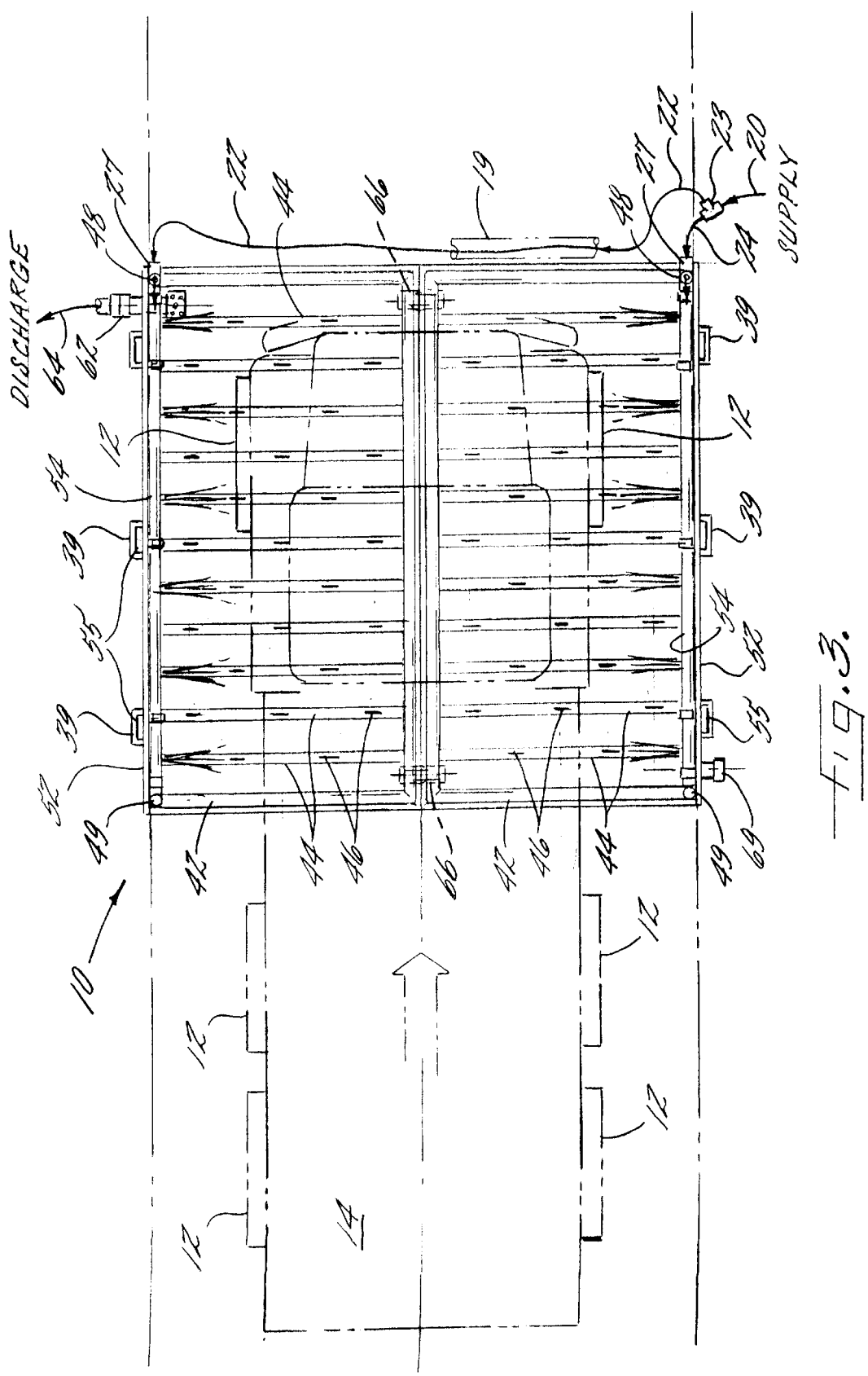

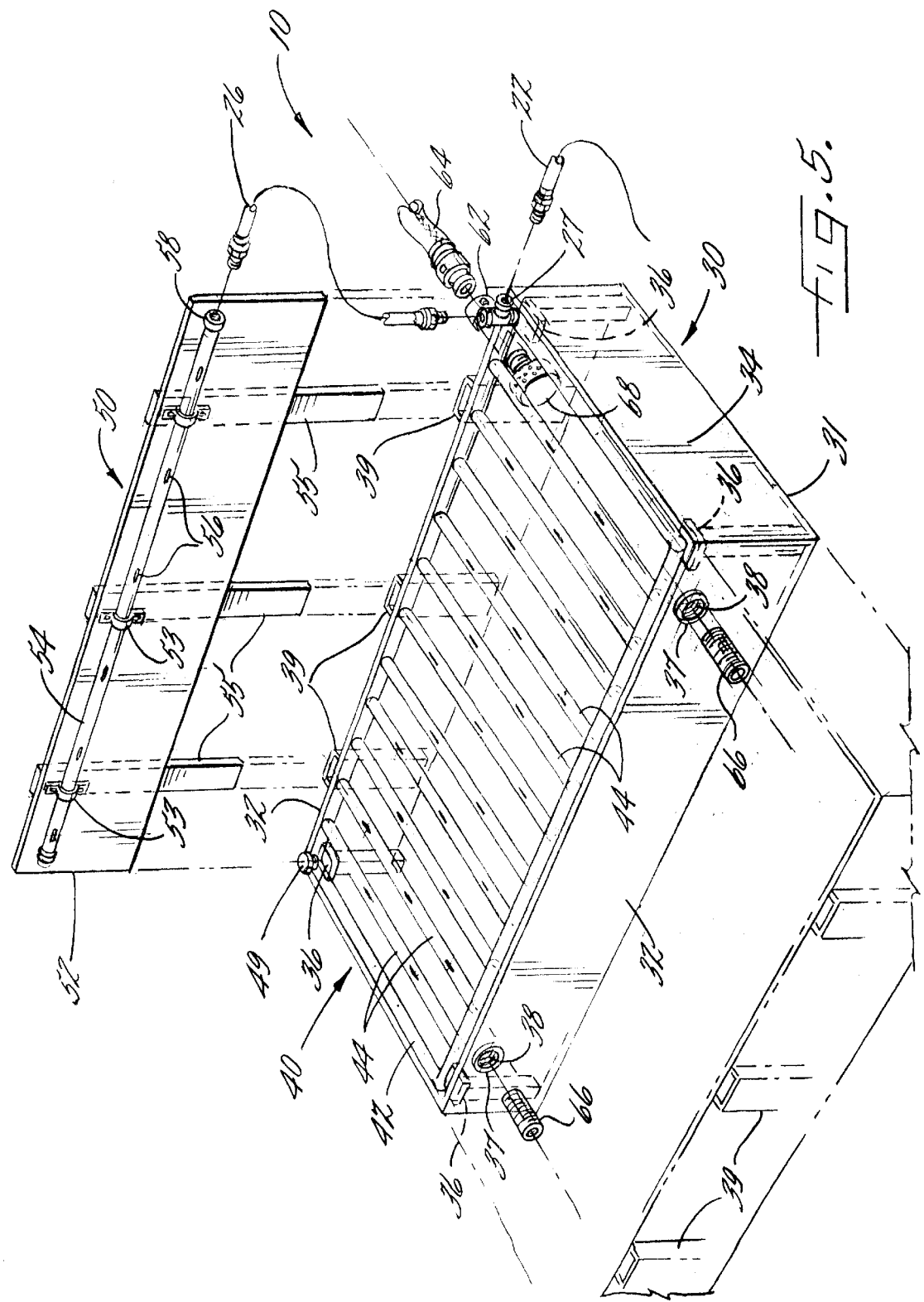

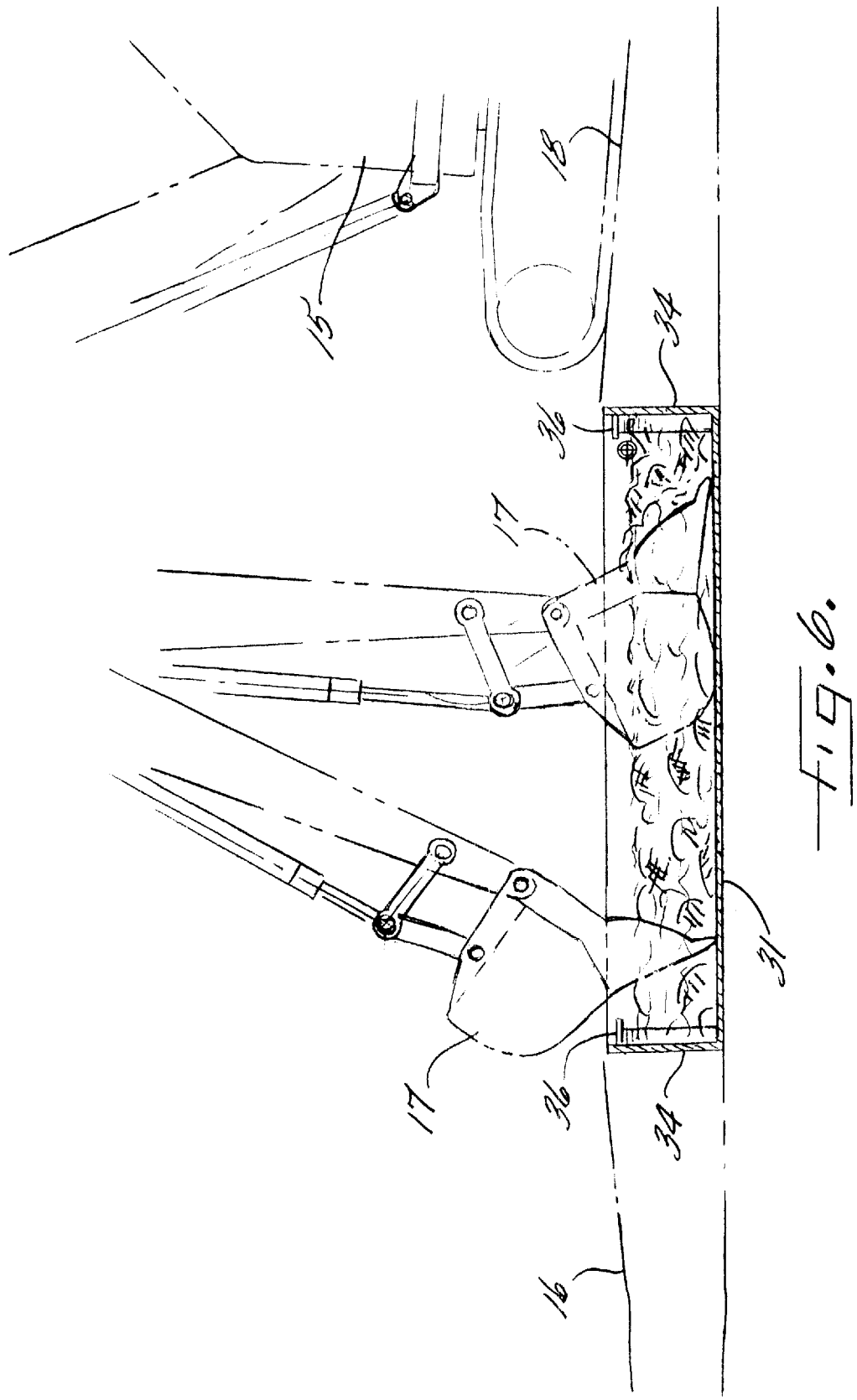

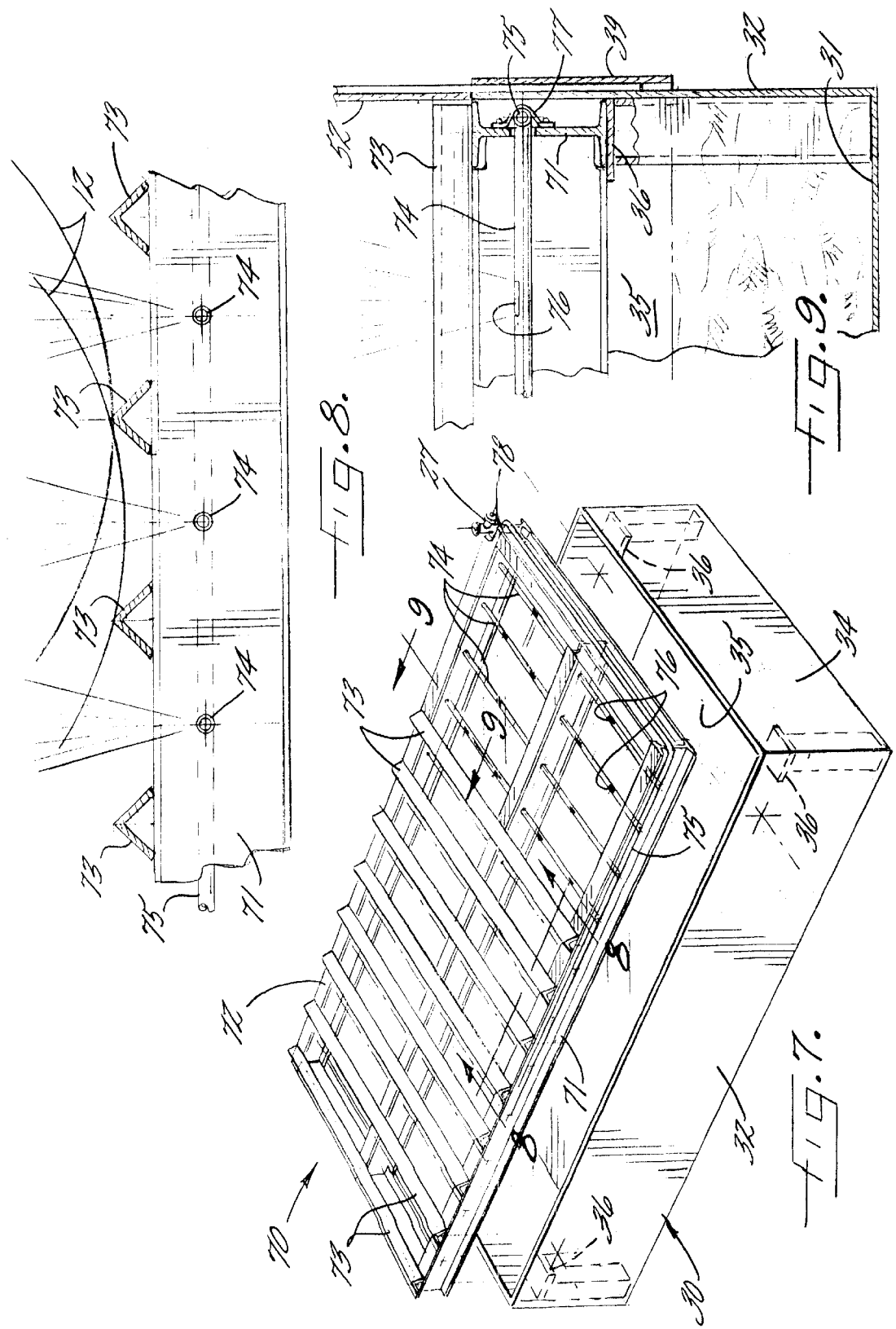

TRUCK TIRE WASHING APPARATUS AND METHOD

CROSS-REFERENCE TO RELATED APPLICATION (none)

FIELD OF THE INVENTION

The invention relates to an apparatus and method for washing the undercarriage and tires of a vehicle, and more particularly, to an apparatus and method for washing mud, dirt and silt from the tires of a truck leaving a construction site.

BACKGROUND OF THE INVENTION

At many construction sites, particularly in urban areas, the land must be cleared of debris and a large amount of soil must be excavated from the construction site before construction can commence. The construction company or general contractor typically contracts with a hauling subcontractor to remove the debris and excavated soil. The hauling subcontractor typically utilizes dump trucks to transport the debris and excavated soil from the construction site to a dumpsite. The dump trucks have large tires, typically four feet or more in diameter, that collect substantial amounts of mud, dirt and silt from the construction site. The mud, dirt and silt on the tires of the truck is dispersed onto the roadways leading away from the construction site as the truck departs the construction site for the dumpsite. Generally, the concentration of mud, dirt and silt dispersed from the truck tires is greatest on the roadways immediately surrounding the construction site.

Motorists that encounter the mud, dirt and silt dispersed onto the roadway as they pass the construction site often complain to the local authorities, such as the police or erosion control officials, about the condition of the roadway. The local authorities in turn instruct the construction company or general contractor to clean the mud, dirt and silt from the roadways surrounding the construction site. Those that do not comply may be assessed a fine in the event that the local municipality is required to clean the roadways. Typically, the construction company or general contractor demand that the hauling subcontractor be responsible for maintaining the roadways surrounding the construction site substantially free of the mud, dirt and silt that is dispersed from the tires of the trucks leaving the construction site. Accordingly, many hauling subcontractors own or rent street cleaning machines which carry tanks of water or connect to municipal fire hydrants to provide the water necessary to wash the mud, dirt and silt from the roadways surrounding the construction site.

While the street cleaning machines generally do an adequate job of washing the mud, dirt and silt from the roadways, they create a serious environmental problem. The water carrying the mud, dirt and silt from the surrounding roadways runs off into the municipal storm drain system. The mud, dirt and silt travels through the storm drain system and eventually reaches a run-off creek where it collects and causes the creek to overflow its banks when it rains. As a result, property adjoining the run-off creek floods and the property owners complain to the local authorities about the damage and inconvenience suffered as a result of the flooding. Once again, the local authorities may instruct the construction company or general contractor to remove the excess mud, dirt and silt from the run-off creek or may impose a fine in the event that the local municipality is required to dredge the storm drain system or the run-off creek. Furthermore, the mud, dirt and silt washed into the storm drain system may contain a higher than acceptable concentration of petroleum and petroleum by-products acquired from the construction site and the roadway that pose a serious threat of polluting the run-off creek.

As a result of dirty roadways, clogged storm drains and run-off creeks, flooding and pollution, more and more municipalities are enacting ordinances that require the tires of trucks leaving a construction site be washed before the trucks leave the construction site. In municipalities that have enacted such ordinances, the present practice is to construct a ramp leading to an elevated grate. The truck drives up the ramp and the tires of the truck are positioned on the grate. A worker then manually washes the mud, dirt and silt from the tires using a small diameter fire hose connected to a source of water. It typically takes between eight and ten minutes to wash the tires of each truck leaving the construction site. Thus, the present apparatus and method is time consuming, and therefore, not cost effective. Furthermore, the mud, dirt and silt from the tires of the truck is washed back onto the construction site. On many construction sites, and in particular on urban construction sites, the area of the excavation covers the entire construction site. Washing the mud, dirt and silt back onto the construction site is therefore unacceptable because and the mud, dirt and silt collect inside the excavation.

It is apparent that there exists a need for an apparatus and method for washing the tires of trucks. More particularly, there exists a need for an apparatus and method for washing mud, dirt and silt from the tires of trucks leaving a construction site to prevent the mud, dirt and silt from being dispersed onto the roadways surrounding the construction site. There exists a further need for an apparatus and method for washing mud, dirt and silt from the tires of trucks leaving a construction site that prevents the mud, dirt and silt from being washed into a municipal storm drain. There exists a further need for an apparatus and method for washing mud, dirt and silt from the tires of trucks leaving a construction site that is cost effective. There exists a further need for an apparatus and method for washing mud, dirt and silt from the tires of trucks leaving a construction site that prevents the mud, dirt and silt from being washed back onto the construction site.

SUMMARY OF THE OBJECTS OF THE INVENTION

Accordingly, it is a principal object of the present invention to provide an apparatus and method for washing the tires of trucks.

It is another, and more particular, object of the present invention to provide an apparatus and method for washing mud, dirt and silt from the tires of trucks leaving a construction site.

It is yet another object of the present invention to provide an apparatus and method for washing mud, dirt and silt from the tires of trucks leaving a construction site that prevents the mud, dirt and silt from being washed into a municipal storm drain.

It is yet another object of the present invention to provide an apparatus and method for washing mud, dirt and silt from the tire of trucks leaving a construction site that is cost effective.

It is yet another object of the present invention to provide an apparatus and method for washing mud, dirt and silt from the tires of trucks leaving a construction site that prevents the mud, dirt and silt from being washed back onto the construction site.

It is yet another object of the present invention to provide an apparatus for washing mud, dirt and silt from the tires of trucks leaving a construction site that is substantially portable, readily assembled and readily disassembled for storage or transport from one construction site to another.

SUMMARY OF THE INVENTION

The invention is an apparatus and method for washing mud, dirt and silt from the tires of a truck leaving a construction site. The apparatus includes a water supply line, a collection basin and a grate positioned above the collection basin. The apparatus further includes an optional side rail attached to the collection basin above the grate and an optional drainage system. The water supply line supplies water from a source of water, such as an external tank and pump or a municipal fire hydrant, for washing the mud, dirt and silt off the tires of the truck. The collection basin includes a generally rectangular floor, a pair of opposed end walls and a pair of opposed side walls. Preferably, the end walls and the side walls form a continuous side wall extending upwardly from the floor of the collection basin. Together, the floor and the continuous side wall define an interior cavity of the collection basin for collecting the mud, dirt and silt and the run-off water from the source of water used to wash the tires of the truck. The collection basin further includes a plurality of grate supports for supporting the grate above the interior cavity and a plurality of drain ports formed in the opposed side walk. Each of the drain ports is fitted with a gasket for receiving a component of the optional drainage system or a plug. The collection basin further includes a plurality of side rail receptacles for attaching the side rail to the collection basin.

The grate includes a hollow, generally rectangular frame and a plurality of hollow, transverse spray tubes in fluid communication with the frame. The frame has an intake port located at a corner of the collection basin adjacent the exterior side wall. Preferably, a selector valve is positioned within the intake port and the water supply is connected to the selector valve such that the frame and the spray tubes are in fluid communication with the water supply line. Each of the spray tubes has a plurality of spray ports formed therein for directing a high pressure stream of the water from the water source at the tires of the truck when the selector valve is opened. In an alternative embodiment, the frame of the grate includes at least two longitudinally extending beams and a plurality of equally spaced, transverse tire supports affixed to the upper surface of the beams. The spray tubes of the grate are positioned below the tire supports and pass through a series of holes formed in the beams. The ends of the spray tubes are in fluid communication with a generally rectangular spray tube frame affixed to the exterior surfaces of the outer beams. The spray tube frame has an intake port located at a corner of the collection basin adjacent the exterior side wall such that the spray tube frame is in fluid communication with the water supply line. Each of the spray tubes has a plurality of spray ports formed therein for directing a high pressure stream of the water from the water source at the tires of the truck when the selector valve is opened.

The optional side rail includes a side rail panel and at least one side rail spray tube affixed to the side rail panel. The side rail further includes a plurality of side rail posts depending downwardly from the side rail panel. The side rail posts are received within the side rail receptacles of the collection basin to attach the side rail to the exterior side wall of the collection basin. The side rail panel is generally rectangular and has a lengthwise dimension that is approximately the same as the lengthwise dimension of the collection basin and the grate. The side rail spray tube is affixed to the side rail panel such that the side rail spray tube is located at about the center of the tires of the truck. The side rail spray tube has an intake port at one end for receiving an auxiliary water supply line routed from the selector valve such that the side rail spray tube is in fluid communication with the water supply line. The side rail spray tube further has a plurality of spray ports formed therein for directing a high pressure stream of the water from the water source at the tires of the truck when the selector valve is opened.

Preferably, the apparatus includes a left-hand collection basin and a right hand collection basin positioned generally parallel to and adjacent the left-hand collection basin. Likewise, the apparatus preferably includes a left-hand grate positioned above the left-hand collection basin and a right-hand grate positioned above the right-hand collection basin If utilized, the apparatus preferably further includes a left-hand side rail attached to the left-hand collection basin and a right-hand side rail attached to the right-hand collection basin. Preferably, the collection basin, the grate and the side rail are universal such that the collection basin can be used as either a left-hand collection basin or a right-hand collection basin. Likewise, the grate can be used as either a left-hand grate or a right-hand grate and the side rail can be used as either a left-hand side rail or a right-hand side rail. If utilized, the optional drainage system includes a pair of drain conduits positioned within the drain ports formed in the interior side wall of the left-hand collection basin and the right-hand collection basin. Accordingly, the left-hand collection basin is in fluid communication with the right-hand collection basin. The drainage system further includes discharge hose coupler positioned within one of the drain ports formed in the exterior side wall of the left-hand collection basin or the right-hand collection basin. A discharge hose is connected to the discharge hose coupler such that the interior cavities of the left-hand collection basin and the right-hand collection basin are in fluid communication with an external recycling tank or a municipal storm drain.

The tires of a truck leaving the construction site are driven onto the grates positioned above the interior cavities of the collection basins. As the tires pass over the grates, water from the water source flows through the left-hand water supply line and the right-hand water supply line to the selector valves on the frames of the left-hand grate and the right-hand grate, respectively. The selector valves are opened to deliver the water from the water source only to the frames and the spray tubes of the left-hand grate and the right-hand grate. If the optional side rails are utilized, the selector valves are opened to deliver the water from the water source to both the frames and spray tubes of the left-hand grate and the right-hand grate and to the side rail spray tubes of the left-hand side rail and the right-hand side rail. Alternatively, the selector valve may be opened to deliver the water from the water source only to the spray tubes of the left-hand side rail and the right-hand side rail. Regardless, a high pressure stream of the water from the water source is emitted from the spray ports and/or the side rail spray ports and directed at the tires of the truck. After the mud, dirt and silt from the construction site are sufficiently washed off, the tires of the truck are driven off the grates and onto a roadway surrounding the construction site. The mud, dirt and silt washed off the tires of the truck collects in the interior cavities of the collection basins. The run-off water from the water source the water source also collects in the interior cavities of the collection basins until the run-off water reaches the level of the drain conduits and the discharge hose coupler positioned within the drain ports formed in the side walls of the collection basins. Thereafter, the run-off water drains through the discharge hose into the external recycling tank or the municipal storm drain. When the amount of mud, dirt and silt collected in the interior cavities of the collection basins reaches a predetermined level, the grates are removed to permit access to the interior cavities of the collection basins. The mud, dirt and silt is then removed from the interior cavities of the collection basins using a conventional excavator, backhoe or front-end loader having a smooth edge bucket. When the excavation is complete, the apparatus is easily disassembled and readily stored or transported to another construction site.

BRIEF DESCRIPTION OF THE DRAWINGS

The foregoing and other objects will become more readily apparent by referring to the following detailed description and the appended drawings in which:

FIG. 1 is a side sectional view taken along line 1—1 of FIG. 2 of an apparatus for washing the tires of trucks according to the present invention;

FIG. 2 is a front sectional view taken along line 2—2 of FIG. 1 of the apparatus of FIG. 1;

FIG. 3 is a top plan view of the apparatus of FIG. 1;

FIG. 4 is a perspective view of a typical spray bar of the apparatus of FIG. 1;

FIG. 5 is an exploded perspective view illustrating the assembly of the apparatus of FIG. 1;

FIG. 6 is a side sectional view illustrating the manner in which the mud, dirt and silt that collects in the collection basin of the apparatus of FIG. 1 is emptied;

FIG. 7 is an exploded perspective view of an alternative embodiment of the grate of the apparatus of FIG. 1; and FIG. 8 is a partial sectional view taken along line 8—8 of FIG. 7 of the grate of FIG. 7; and FIG. 9 is a partial sectional view taken along line 9—9 of FIG. 7 of the grate of FIG. 7.

DETAILED DESCRIPTION OF THE PREFERRED EMBODIMENTS

The invention is an apparatus and method for washing the undercarriage and tires of a vehicle, and more particularly, for washing mud, dirt and silt from the tires of trucks leaving a construction site. During construction, and in particular during excavation of the construction site, the tires of the trucks utilized on the construction site collect a substantial amount of mud, dirt and silt. As the trucks leave the construction site the mud, dirt and silt falls from the tires of the trucks onto the roadways surrounding the construction site. Particularly in urban areas, the mud, dirt and silt must be removed from the roadways surrounding the construction site. Typically, the roadways are cleaned by conventional street cleaning machines and the mud, dirt and silt is washed into a municipal storm drain leading to a run-off creek. Eventually, the mud, dirt and silt clogs the storm drain or the run-off creek, which can cause flooding of the property adjoining the run-off creek. Accordingly, the storm drain must be cleared and the run-off creek dredged periodically. Flood damage and the cost of maintaining the storm drain and the run-off creek clear of mud, dirt and silt is expensive. Accordingly, many municipalities now require that mud, dirt and silt be washed from the tires of trucks leaving the construction site. The present invention provides an apparatus and method for washing mud, dirt and silt from the tires of trucks leaving a construction site that prevents the mud, dirt and silt from being washed into a municipal storm drain. The apparatus and method of the present invention is cost effective and prevents the mud, dirt and silt from being washed back onto the construction site. Furthermore, the apparatus of the present invention is substantially portable and is readily assembled and readily disassembled for storage or transport to another construction site.

Specifically, the present invention provides an apparatus, indicated generally in the accompanying figures at 10, for washing the tires 12 of a truck 14. The apparatus 10 is suitable for washing the tires of a truck under a variety of circumstances, but is most useful for washing mud, dirt and silt from the tires 12 of a truck 14 leaving a construction site. The apparatus 10 comprises a water supply line 20, a collection basin 30 and a grate 40. The apparatus may further comprise an optional side rail 50 and an optional drainage system 60. Preferably, the collection basin 30 and the grate 40 are positioned at a suitable location adjacent an exit from the construction site onto a surrounding roadway. As best shown in FIG. 1, an entrance ramp 16 and an exit ramp 18 of sufficient length are provided adjacent the entrance end and the exit end, respectively, of the collection basin 30. The entrance ramp 16 and the exit ramp 18 may be formed of any conventional material, such as wood or metal. Preferably, however, the entrance ramp 16 and the exit ramp 18 are formed by depositing a sufficient amount of gravel adjacent the entrance end and the exit end of the collection basin 30 to provide a smooth and gradual transition from the construction site up to the elevation of the grate 40 and from the elevation of the grate 40 down to the roadway. Thus, the a truck 14 can be driven from the construction site up the entrance ramp 16 onto the grate 40 and down the exit ramp 18 to the roadway as the truck 14 leaves the construction site. Alternatively, the collection basin 30 may be placed in an excavation (not shown) of sufficient depth such that the truck 14 may be driven directly onto the grate 40 and off again. In either case, a pass-through conduit 19 is provided below the elevation of the grate 40 for routing the water supply line 20 from one side of the apparatus 10 to the other. Accordingly, the tires 12 on both sides of the truck 14 can be washed simultaneously without the need for a second water supply line 20 or a complex network of fluid couplings.

The water supply line 20 comprises a hollow conduit connected at one end to a source of water, such as a conventional water tank and pump (not shown). Preferably, however, the water supply line 20 is a small diameter fire hose connected at one end to a municipal fire hydrant (not shown). The operator of the apparatus 10, typically a hauling subcontractor, may be licensed by the municipality to open and remove water from the municipal fire hydrant and the water supply line 20 may be metered such that the operator is charged for use of the municipal water source. As shown in FIG. 2, the opposite end of the water supply line 20 is connected to a flow control valve 21 that may be opened or closed to alternately start and stop the flow of water from the water source. A "T" valve 23 is provided downstream of the flow control valve 21 for diverting the water from the water supply line 20 into a left-hand water supply line 22 and a right-hand water supply line 24. If necessary, the diameters of the left-hand water supply line 22 and the right-hand water supply line 24 may be reduced sufficiently to maintain adequate pressure of the water from the water source. The free end of the left-hand water supply line 22 terminates adjacent a left-hand grate 40 and the right-hand water supply line 24 terminates adjacent a right-hand grate 40 such that the tires 12 on both sides of the truck 14 can be washed simultaneously.

Preferably the free ends of the left-hand water supply line 22 and the right-hand water supply line 24 each terminate at a selector valve 27 in fluid communication with the left-hand grate 40 and the right-hand grate 40, respectively. The selector valve 27 may be opened to permit the water from the water source to flow to the grate 40, to the optional side rail 50 or to both the grate 40 and the side rail 50. When the side rail 50 is utilized, a left-hand auxiliary water supply line 26 is provided to supply water from the water source to a left-hand side rail 50 and a right-hand auxiliary water supply line 28 is provided to supply water from the water source to a right-hand side rail 50 such that the tires 12 on both sides of the truck 14 can be washed simultaneously. If necessary, the diameters of the left-hand auxiliary water supply line 26 and the right-hand auxiliary water supply line 28 may be reduced sufficiently to maintain adequate pressure of the water from the water source. Preferably, the selector valve 27 is a four-way flow valve. A first setting of the selector valve 27 permits the water from the water source to flow to the grate 40, but not to the side rail 50. A second setting of the selector valve 27 permits the water from the water source to flow to the grate 40 and to the side rail 50. A third setting of the selector valve 27 permits the water from the water source to flow to the side rail 50, but not to the grate 40. A fourth setting of the selector valve 27 prevents the water from the water source from flowing to the grate 40 or to the side rail 50. Accordingly, the tires 12 on each side of the truck 14 may be washed utilizing only the grate 40, both the grate 40 and the side rail 50, or only the side rail 50.

The collection basin 30 comprises a generally rectangular floor 31, a pair of opposed side walls 32 and a pair of opposed end walls 34. The side walls 32 and the end walls 34 are affixed to the edges of the floor 31 and depend upwardly therefrom. In addition, each of the side walls 32 is affixed to each of the end walls 34 such that the side walls 32 and end walls 34 define a continuous wall depending upwardly from the floor 31. Together, the floor 31, the side walls 32 and the end walls 34 of the collection basin 30 define a interior cavity 35 for receiving the mud, dirt and silt washed from the tires 12 of the truck 14 and the run-off water used to wash the tires 12 of the truck 14. The floor 31, side walls 32 and end walls 34 may be affixed to one another in any conventional manner such that the collection basin 30 is substantially watertight. Preferably, however, the floor 31, side walls 32 and end walls 34 are made of metal and welded together. The collection basin 30 further comprises a plurality of grate supports 36 for supporting the grate 40 on top of the collection basin 30 above the interior cavity 35. Preferably, the grate supports 36 are located at each corner of the collection basin 30 and are formed by welding one leg of a suitable length of conventional L-shaped angle iron to the interior surface of one of the side walls 32 and the other leg to the interior surface of one of the end walls 34. Additional grate supports 36 may be positioned as necessary at appropriate intervals along the length of the side walls 32 and the width of the end walls 34 to support the grate 40 on the collection basin 30 under the weight of the truck 14 distributed by the tires 12. The additional grate supports 36 may be similarly formed by welding the legs of a suitable length of conventional U-shaped angle iron to the interior surface of one of the side walls 32 or to one of the end walls 34. Alternatively, the grate supports 36 may form a thin, continuous lip around the entire collection basin 30 adjacent the upper edge of the side walls 32 and the end walls 34.

As best shown in FIG. 5, the collection basin 30 further comprises a plurality of drain ports 38 formed in the side walls 32 of the collection basin 30 just below the underside of the grate 40. Each of the drain ports 38 is fitted with an internally threaded gasket 37 for receiving an externally threaded component of the drainage system 60, as will be described. Preferably, the plurality of drain ports 38 comprises a first pair of drain ports 38 formed in the interior side wall 32 of the collection basin 30 and a second pair of drain ports 38 formed in the exterior side wall 32 of the collection basin 30. The collection basin 30 further comprises a plurality of side rail receptacles 39 affixed to the exterior surface of the exterior side wall 32 for securing the side rail 50 (if utilized) on the collection basin 30. Preferably, the plurality of side rail receptacles 39 comprises at least two side rail receptacles 39 each positioned adjacent one of the end walls 34 of the collection basin 30. Most preferably, however, the plurality of side rail receptacles 39 comprises three side rail receptacles 39 equally spaced along the length of the exterior side wall 32 of the collection basin 30, as best shown in FIG. 3. Regardless, the drain ports 38 and the side rail receptacles 39 are positioned on the side walls 32 such that the collection basin 30 is universal. Thus, the collection basin 30 may be used as either a left-hand collection basin 30 or a right-hand collection basin 30.

The grate 40 comprises a hollow, generally rectangular frame 42 sized to fit within the interior cavity 35 of the collection basin 30 and supported by the plurality of grate supports 36. The grate 40 further comprises a plurality of hollow, transverse spray tubes 44 in fluid communication with the hollow frame 42. Preferably, the frame 42 and the spray tubes 44 are made of a non-corrosive material in the form of a cylindrical pipe having a relatively large outer diameter and a relatively small inner diameter. For example, the frame 42 and the spray tubes 44 may be made of a galvanized pipe having an outer diameter of about four inches and an inner diameter of about one inch. The relatively large outer diameter and the relatively small inner diameter of the frame 42 and spray tubes 44 provide sufficient bending strength to support the weight of the truck 14 distributed by the tires 12 of the truck 14 on the grate 40 while maintaining the pressure of the water from the water source. As best shown in FIG. 4, each of the spray tubes 44 has a plurality of spray ports 46 formed in the upper surface for directing a stream of water from the water source onto the undercarriage and the tires 12 of the truck 14. The spray ports 46 may have any configuration. Preferably, however, the spray ports 46 are elongate, longitudinally extending slits of radially increasing width. The spray ports 46 may be located randomly on the upper surface of the spray tube 44. Preferably, however, the spray ports 46 are located in an alternating pattern, as best shown in FIG. 3, to optimize the coverage of the water from the water source on the undercarriage and the tires 12 of the truck 14 regardless of the position of the truck 14 on the grate 40.

The frame 42 is provided with at least one internally threaded intake port 48 for receiving the selector valve 27 so that the frame 42 and the spray tubes 44 are in fluid communication with the source of water from the water supply line 20. Preferably, an intake port 48 is provided at each corner of the grate 40 adjacent the exterior side wall 32. Accordingly, the water from the water source may be delivered to the grate 40 from the entrance end of the apparatus 10 or from the exit end of the apparatus 10 (as shown), or from the entrance end and the exit end of the apparatus 10 simultaneously. In the event that only one of the intake ports 48 of the grate 40 is utilized, the remaining intake port 48 is closed with an externally threaded plug 49 (FIG. 5). Regardless, the intake ports 48 are positioned on the frame 42 such that the grate 40 is universal. Thus, the grate 40 may be used as a left-hand grate 40 or a right-hand grate 40. Preferably, the selector valve 27 has a pair of normally-closed, quick-disconnect couplers for attaching the left-hand water supply line 22 and the left-hand auxiliary water supply line 26 (if utilized) on the left-hand selector valve 27, and the right-hand water supply line 24 and the right-hand auxiliary water supply line 28 (if utilized) on the right-hand selector valve 27. The selector valve 27 can then be selectively positioned to permit the water from the water source to flow only to the grate 40, only to the side rail 50, or to both the grate 40 and the side rail 50, as previously described. Accordingly, a high pressure stream of the water from the water source spreads radially outwardly from the spray ports 46 of the spray tubes 44 in the direction of the undercarriage and the tires 12 of the truck 14 when the selector valve 27 is opened to the first setting or to the second setting.

The optional side rail 50 comprises a generally rectangular side rail panel 52, at least one side rail spray tube 54 having a plurality of side rail spray ports 56 and two or more side rail posts 55. Preferably, the side rail panel 52 is approximately the same length as the side walls 32 of the collection basin 30. As best shown in FIG. 5, the side rail spray tube 54 is attached to the interior surface of the side rail panel 52, for example, by a plurality of conventional U-shaped pipe clamps 53. The side rail spray tube 54 has at least one intake port 58 at one end for receiving the left-hand auxiliary water supply line 26 or the right-hand auxiliary water supply line 28. Preferably, however, an intake port 58 is provided at each end of the side rail spray tube 54 adjacent the end wall 34. Accordingly, water from the water source may be delivered to the side rail spray tube 54 from the entrance end of the apparatus 10 or from the extend of the apparatus 10 (as shown), or from the entrance end and the exit end of the apparatus 10 simultaneously. In the event that only one of the intake ports 58 of the side rail spray tube 54 is utilized, the remaining intake port 58 is closed with a plug 59 (FIG. 5). Regardless, the intake ports 58 are positioned on the side rail panel 52 such that the side rail 50 is universal. Thus, the side rail 50 may be used as a left-hand side rail 50 or a right-hand side rail 50. Preferably, the intake port 58 has a normally-closed, quick-disconnect coupler for 5 attaching the left-hand auxiliary water supply line 26 onto the side rail spray tube 54 of the left-hand side rail 50, or the right-hand auxiliary water supply line 28 onto the side rail spray tube 54 of the right-hand side rail 50. Each of the side rail spray tubes 54 has a plurality of elongate, longitudinally extending spray ports 56 of radially increasing width formed therein. Accordingly, a high pressure stream of the water from the water source spreads radially outwardly from the spray ports 56 of the side rail spray tubes 54 in the direction of the tires 12 of the truck 14 when the selector valve 27 is opened to the second setting or to the third setting.

The optional drainage system 60 comprises a discharge hose coupler 62, a discharge hose 64 and a pair of drain conduits 66 (FIG. 5). One end of the discharge hose coupler 62 is externally threaded to be received by the internally threaded gasket 37 positioned in one of the drain ports 38 formed in the exterior side wall 32 of the collection basin 30. The other end of the discharge hose coupler 62 preferably has a normally closed, quick-disconnect fitting for receiving an adapter on the end of the discharge hose 64 so that the discharge hose 64 is in fluid communication with the run-off water collected in the interior cavity 35 of the collection basin 30. The other end of the discharge hose 64 may be routed to a municipal storm drain or to an external tank for recycling the run-off water back through the apparatus 10. The drain conduits 66 are externally threaded to be received by the internally threaded gaskets 37 positioned in the drain ports 38 formed in the interior side walls 32 of the left-hand collection basin 30 and the right-hand collection basin 30. The drain conduits 66 and the gaskets 37 form a watertight connection so that the run-off water in the interior cavity 35 of the left-hand collection basin 30 is in fluid communication with the run-off water in the interior cavity 35 of the right-hand collection basin 30. Accordingly, the run-off water in both the left-hand collection basin 30 and the right-hand collection basin 30 can drain through the discharge hose 64 to the municipal storm drain or to the external recycling tank. The drainage system 60 may further comprise a debris screen 68 for preventing debris trapped in the interior cavity 35 of the collection basin 30 from clogging the discharge hose coupler 62 or the discharge hose 64. The debris screen has an externally threaded end to be received by the internally threaded gasket 37 within the drain port 38 opposite the discharge hose coupler 62. Typically, a single discharge hose coupler 62 and discharge hose 64 are sufficient to drain the run-off water from both the left-hand collection basin 30 and the right-hand collection basin 30. However, more than one discharge hose coupler 62 and discharge hose 64 may be utilized if necessary. Regardless, each of the unused drain ports 38 formed in the exterior side walls 32 of the left-hand collection basin 30 and the right-hand collection basin 30 is closed with an externally threaded drain plug 69 (FIG. 3).

In operation, the apparatus 10 is positioned at a suitable location adjacent an exit from the construction site onto the surrounding roadway. The apparatus 10 comprises a left-hand collection basin 30 covered by a left-hand grate 40 and a right-hand collection basin 30 covered by a right-hand grate 40. Preferably, the collection basin 30 and the grate 40 are universal so that the same collection basin 30 can be utilized as the left-hand collection basin and the right-hand collection basin and the same grate 40 can be utilized as the left-hand grate and the right-hand grate. The apparatus 10 may further comprise an optional left-hand side rail 50 and right-hand side rail 50. Preferably, the side rail 50 is universal so that the same side rail 50 can be utilized as the left-hand side rail and the right-hand side rail. The collection basin 30 and the grate 40 each have a length dimension of about 12 feet and a width dimension of about 6 feet. The length dimension of the collection basin 30 and the grate 40 is preferably about 12 feet because the diameter of a typical tire 12 of a truck 14 utilized on a construction site is about 4 feet. Accordingly, the circumference of the tire 12, and thus the length of the tread, is about 12 feet. The collection basin 30 may have any suitable depth dimension, but preferably is at least 2 feet deep so that a substantial amount of mud, dirt and silt and run-off water can be collected in the interior cavity 35 before the collection basin 30 must be emptied, as will be described. The length dimension of the side rail 50 is likewise about 12 feet and the height dimension of the side rail 50 is at least about 2 feet. Accordingly, the side rail spray tube 54 is positioned at about the center of the tires 12 of the truck 14, as best shown in FIG. 1 and FIG. 2. The collection basin 30, grate 40 and side rail 50 are provided in universal left-hand and right-hand halves so that the apparatus 10 is substantially portable and the components of the apparatus 10 may be conveniently stacked for storage or transportation from one construction site to another, for example on a conventional flatbed truck. The smaller size of the universal left-hand and right-hand halves of the collection basin 30, the grate 40 and the side rail 50 facilitate the positioning, assembly and disassembly of the apparatus 10. In particular, the collection basin 30, grate 40 and side rail 50 halves can be easily maneuvered into position by a conventional tractor, excavator, backhoe or front-end loader.

Once the location of the apparatus 10 is selected, the collection basins 30 are positioned on the ground adjacent and parallel to one another. If the optional drainage system 60 is to be utilized, the drain conduits 66 are threaded into the gaskets 37 positioned in the drain ports 38 provided on the interior side walls 32 of the collection basins 30. Similarly, the discharge hose coupler 62 and the debris screen 68 are threaded into the gasket 37 positioned in one of the drain ports 38 provided in the exterior side walls 32 of the collection basins 30. Each of the unused drain ports 38 in the exterior side walls of the collection basins 30 is then closed with a drain plug 69. Next, the frames 42 of the grates 40 are then positioned on top of the grate supports 36 over the interior cavities 35 of the collection basins 30. The water supply line 20 is then routed from the water source to the T valve 23. The left-hand water supply line 22 and the right-hand water supply line 24 are then routed from the T-valve 23 to the selector valves 27 on the frame 42 of the left-hand grate 40 and the frame 42 of the right-hand grate 40, respectively. If the optional side rails 50 are to be utilized, the side rail posts 55 are positioned in the corresponding side rail post receptacles 39 provided on the collection basins 30. The left-hand auxiliary water supply line 26 and the right-hand auxiliary water supply line 28 are then routed from the selector valves 27 on the frames 42 of the grates 40 to the side rail spray tubes 54 on the left-hand side rail 50 and the right-hand side rail 50, respectively. Finally, the discharge hose 64 is connected to the discharge hose coupler 62 and routed to the external recycling tank or the municipal storm drain, as desired. If the grates 40 are positioned above the elevation of the construction site and the surrounding road, the entrance ramp 16 and the exit ramp 18 are then constructed in a conventional manner adjacent the entrance end 34 and the exit end 34, respectively, of the collection basins 30.

Once the apparatus 10 is assembled, a truck 14 leaving the construction site is driven up the entrance ramp 16 onto the grates 40 over the interior cavities 35 of the collection basins 30. As the tires 12 of the truck 14 pass over the grates 40, the flow control valve 21 is opened to permit the water from the water source to flow through the water supply line 20 into the left-hand water supply line 22 and the right-hand water supply line 24 to the selector valves 27 on the frames 42 of the left-hand grate 40 and the right-hand grate 40, respectively. The selector valves 27 are then turned to the first position so that the water from the water source is delivered to the frames 42, and thus the spray tubes 44, of the grates 40. If use of the optional side rails 50 is desired, the selector valves 27 are turned to the second setting so that the water from the water source flows into the frames 42 of the grates 40 and into the left-hand auxiliary water supply line 26 and the right-hand auxiliary water supply line 28 to the side rail spray tubes 54 on the left-hand side rail 50 and the right-hand side rail 50, respectively. Accordingly, a high pressure stream of the water from the water source will be directed by the spray ports 46 of the spray tubes 44 and the spray ports 56 of the side rail spray tubes 54 (if side rails 50 are utilized) at the tires 12 of the truck 14. After the mud, dirt and silt from the construction site is sufficiently washed off the tires 12, the truck 14 is driven down the exit ramp 18 onto the surrounding roadway.

The mud, dirt and silt washed off the tires 12 of the truck 14 collects in the interior cavities 35 of the collection basins 30. Likewise, the run-off water from the water source the water source collects in the interior cavities 35 of the collection basins 30 until the run-off water reaches the level of the drain conduits 66 and the discharge hose coupler 62. Thereafter, the run-off water in the collection basins 30 drains through the discharge hose 64 into the external recycling tank or the municipal storm drain, as desired. When the amount of mud, dirt and silt collected in the interior cavities 35 of the collection basins 30 reaches a predetermined level, the collection basins 30 may be readily cleaned. The valve 21 is closed to prevent the water from the water source from flowing through the water supply line 20 into the left-hand water supply line 22 and the right-hand water supply line 24. The left-hand water supply line 22 and the right-hand water supply line 24 are then disconnected from the selector valves 27 on the frames 42 of the left-hand grate 40 and the right hand grate 40, respectively. Next, the grates 40 are removed to permit access to the interior cavities 35 of the collection basins 30. The mud, dirt and silt is then removed from the interior cavities 35 of the collection basins 30. As illustrated in FIG. 6, the mud, dirt and silt is preferably removed from the interior cavities 35 of the collection basins 30 using a conventional excavator, backhoe or front-end loader 15 having a smooth edge bucket 17. When the excavation is complete, the apparatus 10 is easily disassembled and readily stored or transported to another construction site.

FIGS. 7–9 illustrate an alternative embodiment of a grate 70 for use with the apparatus 10. The grate 70 replaces the grate 40 and is positioned on the grate supports 36 of the collection basin 30, as previously described. The grate 70 comprises a frame 72 and a plurality of hollow, transverse spray tubes 74. The frame 72 comprises at least two, and preferably three equally spaced, longitudinally extending beams 71 having a conventional I-shaped cross section. The frame 72 further comprises a plurality of equally spaced, transverse tire supports 73 affixed to the upper surface of the beams 71. The tire supports 73 are spaced sufficiently to receive the tires 12 of the truck 14 thereon while at the same time exposing as much of the treads of the tires 12 as possible. Preferably, the tire supports 73 are made of conventional L-shaped angle iron and each leg of the tire support 73 is welded to the upper surface of the beams 71. The spray tubes 74 are positioned below the tire supports 73 and pass through a series of holes formed at a medial location in the webs of the I-shaped beams 71. The ends of the spray tubes 74 are in fluid communication with a generally rectangular spray tube frame 75 affixed to the exterior surfaces of the outer beams 71 by a plurality of conventional U-shaped pipe clamps 77 (FIG. 9). Alternatively, the spray tubes 74 may be positioned on the upper surface of the beams 71 immediately beneath the tire supports 73. Furthermore, only one end of the spray tubes 74 may be in fluid communication with the frame 72 while the other end of the spray tubes 74 is closed or plugged. The spray tube frame 75 has at least one intake port 78 located at a corner of the collection basin 30 adjacent the exterior side wall 32 for receiving the selector valve 27 therein, as previously described. Accordingly, the water from the water source can be delivered to the spray tube frame 75 and the spray tubes 74 through the selector valve 27. Each of the spray tubes 74 has a plurality of elongate, transversely extending spray ports 76 of radially increasing width formed therein Accordingly, a high pressure stream of the water from the water source spreads radially outwardly from the spray ports 76 of the spray tubes 74 in the direction of the tires 12 of the truck 14 when the selector valve 27 is opened to the first setting or to the second setting. If the spray tubes 74 are positioned beneath the tire supports 73, the tire supports are provided with a plurality of openings (not shown) corresponding to the plurality of spray ports 76 for permitting the water from the water source to pass through the tire supports 23 at the tires 12 of the truck 14.

It is apparent that the present invention provides an apparatus and method for washing the undercarriage and the tires of a vehicle, and in particular, for washing mud, dirt and silt from the tires of trucks leaving a construction site. Obviously, many alternative embodiments may be devised without departing from the spirit and scope of the invention as described and illustrated herein. Accordingly, it is intended that the apparatus and method of the invention be construed as broadly as possible to encompass all equivalent apparatus and methods without departing from the spirit and scope of the invention as described in the preceding specification, illustrated in the accompanying drawings and claimed in the appended claims.

That which is claimed is:

1. An apparatus for washing the tires of a truck leaving a construction site, said apparatus comprising a water supply line for supplying water from a source of water to said apparatus;

a collection basin comprising a generally rectangular floor, a pair of opposed end walls and a pair of opposed side walls, said end walls and said side walls forming a continuous side wall depending upwardly from said floor, said floor and said continuous side wall defining an interior cavity for collecting the mud, dirt and silt washed from the tires of the truck and the run-off water from the source of water, and a grate positioned above said collection basin and supported thereon, said grate comprising a hollow, generally rectangular frame and a plurality of hollow, transverse spray tubes in fluid communication with said frame, said frame comprising at least one intake port in fluid communication with said water supply line, each of said spray tubes having a plurality of spray ports formed therein for directing water from the source of water at the tires of the truck.

2. An apparatus for washing the tires of a truck leaving a construction site according to claim 1 further comprising a side rail positioned above said collection basin and said grate generally parallel to and adjacent one of said opposed side walls of said collection basin, said side rail comprising at least one hollow side rail spray tube in fluid communication with said water supply line and having a plurality of side rail spray ports formed therein for directing water from the source of water at the tires of the truck.

3. An apparatus for washing the tires of a truck leaving a construction site according to claim 2 wherein said side rail further comprises a plurality of downwardly extending side rail posts and wherein said collection basin comprises a corresponding plurality of side rail receptacles on the exterior surface of one of said opposed side walls for receiving said plurality of side rail posts therein.

4. An apparatus for washing the tires of a truck leaving a construction site according to claim 2 further comprising a selector valve positioned within said intake port of said frame, said selector valve having a first setting wherein the water from the source of water is delivered only to said grate, a second setting wherein the water from the source of water is delivered to said grate and said side rail and a third setting wherein the water from the source of water is delivered only to said side rail.

5. An apparatus for washing the tires of a truck leaving a construction site according to claim 1 further comprising a drainage system for draining the run-off water collected in the interior cavity of said collection basin, said drainage system comprising at least one drain port formed in one of said opposed side walls of said collection basin and a discharge hose in fluid communication with the interior cavity of said collection basin.

6. An apparatus for washing the tires of a truck leaving a construction site according to claim 5 wherein said drainage system further comprises a discharge hose coupler positioned within said at least one drain port and extending outwardly from said collection basin and a debris screen positioned within said drain port and extending inwardly into the interior cavity of said collection basin.

7. An apparatus for washing the tires of a truck leaving a construction site according to claim 1 wherein said water supply line comprises a left-hand water supply line and a right-hand water supply line;

said collection basin comprises a left-hand collection basin and a right-hand collection basin positioned generally parallel to and adjacent said left-hand collection basin, said left-hand collection basin in fluid communication with said right-hand collection basin; and said grate comprises a left-hand grate positioned above said left-hand collection basin and supported thereon and a right-hand grate positioned above said right-hand collection basin and supported thereon, said left-hand grate in fluid communication with said left-hand water supply line and said right-hand grate in fluid communication with said right-hand water supply line.

8. An apparatus for washing the tires of a truck leaving a construction site according to claim 7 further comprising a left-hand auxiliary water supply line in fluid communication with said left-hand water supply line;

a right-hand auxiliary water supply line in fluid communication with said right-hand water supply line;

a left-hand side rail positioned above said left-hand collection basin and said left-hand grate generally parallel to and adjacent the exterior one of said opposed side walls of said left-hand collection basin, said left-hand side rail comprising at least one hollow side rail spray tube in fluid communication with said left-hand auxiliary water supply line and having a plurality of side rail spray ports formed therein for directing water from the source of water at the tires of the truck; and a right-hand side rail positioned above said right-hand collection basin and said right-hand grate generally parallel to and adjacent the exterior one of said opposed side walls of said right-hand collection basin, said right-hand side rail comprising at least one hollow side rail spray tube in fluid communication with said right-hand auxiliary water supply line and having a plurality of side rail spray ports formed therein for directing water from the source of water at the tires of the truck.

9. An apparatus for washing the tires of a truck leaving a construction site, said apparatus comprising a water supply line for supplying water from a source of water to said apparatus;

a collection basin comprising a generally rectangular floor, a pair of opposed end walls and a pair of opposed side walls, said end walls and said side walls forming a continuous side wall depending upwardly from said floor, said floor and said continuous side wall defining an interior cavity for collecting the mud, dirt and silt washed from the tires of the truck and the run-off water from the source of water; and a grate positioned above said collection basin and supported thereon, said grate comprising a pair of lengthwise beams positioned generally parallel to and adjacent said opposed side walls of said collection basin, a hollow, generally rectangular spray tube frame and a plurality of hollow, transverse spray tubes in fluid communication with said spray tube frame, said spray tube frame comprising at least one intake port in fluid communication with said water supply line, each of said spray tubes having a plurality of spray ports formed therein for directing water from the source of water at the tires of the truck.

10. An apparatus for washing the tires of a truck leaving a construction site according to claim 9 further comprising a side rail positioned above said collection basin and said grate generally parallel to and adjacent one of said opposed side walls of said collection basin, said side rail comprising at least one hollow side rail spray tube in fluid communication with said water supply line and having a plurality of side rail spray ports formed therein for directing water from the source of water at the tires of the truck.

11. An apparatus for washing the tires of a truck leaving a construction site according to claim 10 wherein said side rail further comprises a plurality of downwardly extending side rail posts and wherein said collection basin comprises a corresponding plurality of side rail receptacles on the exterior surface of one of said opposed side walls for receiving said plurality of side rail posts therein.

12. An apparatus for washing the tires of a truck leaving a construction site according to claim 10 further comprising a selector valve positioned within said intake port of said spray tube frame, said selector valve having a first setting wherein the water from the source of water is delivered only to said grate, a second setting wherein the water from the source of water is delivered to said grate and said side rail and a third setting wherein the water from the source of water is delivered only to said side rail.

13. An apparatus for washing the tires of a truck leaving a construction site according to claim 9 further comprising a drainage system for draining the run-off water collected in the interior cavity of said collection basin, said drainage system comprising at least one drain port formed in one of said opposed side walls of said collection basin and a discharge hose in fluid communication with the interior cavity of said collection basin.

14. An apparatus for washing the tires of a truck leaving a construction site according to claim 13 wherein said drainage system further comprises a discharge hose coupler positioned within said at least one drain port and extending outwardly from said collection basin and a debris screen positioned within said drain port and extending inwardly into the interior cavity of said collection basin.

15. An apparatus for washing the tires of a truck leaving a construction site according to claim 9 wherein said water supply line comprises a left-hand water supply line and a right-hand water supply line;

said collection basin comprises a left-hand collection basin and a right-hand collection basin positioned generally parallel to and adjacent said left-hand collection basin, said left-hand collection basin in fluid communication with said right-hand collection basin; and said grate comprises a left-hand grate positioned above said left-hand collection basin and supported thereon and a right-hand grate positioned above said right-hand collection basin and supported thereon, said left-hand grate in fluid communication with said left-hand water supply line and said right-hand grate in fluid communication with said right-hand water supply line.

16. An apparatus for washing the tires of a truck leaving a construction site according to claim 15 further comprising a left-hand auxiliary water supply line in fluid communication with said left-hand water supply line;

a right-hand auxiliary water supply line in fluid communication with said right-hand water supply line;

a left-hand side rail positioned above said left-hand collection basin and said left-hand grate generally parallel to and adjacent the exterior one of said opposed side walls of said left-hand collection basin, said left-hand side rail comprising at least one hollow side rail spray tube in fluid communication with said left-hand auxiliary water supply line and having a plurality of side rail spray ports formed therein for directing water from the source of water at the tires of the truck; and a right-hand side rail positioned above said right-hand collection basin and said right-hand grate generally parallel to and adjacent the exterior one of said opposed side walls of said right-hand collection basin, said right-hand side rail comprising at least one hollow side rail spray tube in fluid communication with said right-hand auxiliary water supply line and having a plurality of side rail spray ports formed therein for directing water from the source of water at the tires of the truck.

17. A method for washing the tires of a truck leaving a construction site utilizing the apparatus of claim 1, said method comprising the steps of driving the tires of the truck onto the grate positioned above and supported on the collection basin;

delivering the water from the source of water to the frame and spray tubes of the grate through the water supply line;

driving the tires of the truck lengthwise along the grate and the collection basin as the water delivered to the spray tubes and emitted from the spray tube ports is directed at the tires of the truck;

collecting the mud, dirt and silt and the run-off water from the source of water in the interior cavity of the collection basin; and driving the tires of the truck off the grate positioned above and supported on the collection basin onto a roadway surrounding the construction site.

18. A method for washing the tires of a truck leaving a construction site according to claim 17 comprising the further steps of providing a side rail positioned above the collection basin and the grate generally parallel to and adjacent one of the opposed side walls of the collection basin, the side rail comprising at least one hollow side rail spray tube in fluid communication with the water supply line and having a plurality of side rail spray ports formed therein; and delivering the water from the source of water to the side rail spray tube of the side rail through the water supply line so that the water emitted from the side rail spray ports is directed at the tires of the truck.

* * * * *